United States Patent
Hildebrand et al.

(10) Patent No.: US 12,480,460 B1
(45) Date of Patent: Nov. 25, 2025

(54) COMPOSITE TUBULAR STRUCTURE

(71) Applicant: General Electric Company, Schenectady, NY (US)

(72) Inventors: Brady Michael Hildebrand, Niskayuna, NY (US); James A. Tallman, Scotia, NY (US); Grant Henson, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/669,738

(22) Filed: May 21, 2024

(51) Int. Cl.
*F02K 9/97* (2006.01)
*B33Y 80/00* (2015.01)
*F02K 9/64* (2006.01)

(52) U.S. Cl.
CPC ............... *F02K 9/972* (2013.01); *B33Y 80/00* (2014.12); *F02K 9/64* (2013.01)

(58) Field of Classification Search
CPC .................................. F02K 9/64; F02K 9/972
See application file for complete search history.

(56) References Cited

U.S. PATENT DOCUMENTS

| | | | |
|---|---|---|---|
| 2,880,577 A | 4/1959 | Leonard et al. | |
| 2,977,754 A | 4/1961 | Bell, Jr. | |
| 3,096,358 A | 7/1963 | Tumavicus | |
| 3,289,943 A | 12/1966 | Thomas et al. | |
| 3,354,652 A * | 11/1967 | Novotny | F02K 9/64 60/260 |
| 3,693,711 A | 9/1972 | Zygiel | |
| 4,107,919 A * | 8/1978 | Sokolowski | F28F 3/086 165/169 |
| 6,802,179 B2 * | 10/2004 | Hewitt | F02K 9/972 239/127.3 |
| 7,479,302 B2 | 1/2009 | Steffier | |
| 7,980,057 B2 | 7/2011 | Facciano et al. | |
| 8,689,540 B2 * | 4/2014 | Haggander | F02K 9/972 60/260 |
| 9,017,814 B2 | 4/2015 | Xie et al. | |
| 9,926,791 B2 | 3/2018 | Cairo et al. | |

(Continued)

FOREIGN PATENT DOCUMENTS

GB 2279734 A 1/1995

OTHER PUBLICATIONS

Co-Pending U.S. Appl. No. 18/169,302, filed Feb. 15, 2023.
Extended European Search Report issued in corresponding application EP2517399.6 dated Oct. 17, 2025.

*Primary Examiner* — Lorne E Meade
(74) *Attorney, Agent, or Firm* — Carter, DeLuca & Farrell LLP (57) ABSTRACT

A thrust chamber assembly includes a monolithic preform defining a combustion chamber and a nozzle. The monolithic preform has a tubular shape and includes a first end, a second end opposite the first end, an inner surface, and an outer surface. The monolithic preform defines a plurality of fluid inlets disposed at the first end, a plurality of fluid outlets disposed at the first end, and a plurality of fluid passages between the inner surface and the outer surface. The plurality of fluid passages are in fluid communication with the plurality of fluid inlets and the plurality of fluid outlets. The plurality of fluid passages comprise a first pathway portion, a second pathway portion, and a curved portion between the first pathway portion and the second pathway portion.

20 Claims, 4 Drawing Sheets

(56) References Cited

U.S. PATENT DOCUMENTS

| | | |
|---|---|---|
| 10,458,251 B2 | 10/2019 | Gallier |
| 10,494,953 B2 | 12/2019 | Nelboeck et al. |
| 10,739,077 B2 | 8/2020 | Gerstler et al. |
| 11,174,752 B2 | 11/2021 | Dyson et al. |
| 11,193,392 B2 | 12/2021 | Frey |
| 11,242,866 B2 | 2/2022 | Jain et al. |
| 11,293,640 B2 | 4/2022 | Hucker et al. |
| 11,504,887 B2 | 11/2022 | Backues et al. |
| 11,525,420 B2 * | 12/2022 | Goetz ..................... F02K 9/972 |
| 2018/0306516 A1 | 10/2018 | Miller |
| 2019/0331058 A1 * | 10/2019 | Gradl ..................... F02K 9/972 |
| 2020/0339481 A1 | 10/2020 | Hampden-Smith et al. |
| 2022/0340252 A1 | 10/2022 | MacDonald et al. |
| 2023/0015392 A1 | 1/2023 | Van Affelen et al. |

* cited by examiner

COMPOSITE TUBULAR STRUCTURE

FIELD

The present subject matter relates generally to components and processes of fabricating components, or more particularly to composite tubular structures.

BACKGROUND

A thrust chamber assembly for a propulsion device generally includes a combustion chamber and a nozzle. Conventional thrust chamber assemblies may also include fluid passages or channels for receiving a cooling fluid. Often the cooling fluid is the combustion liquid fuel which needs to return to the top of the combustion chamber after cooling the nozzle. Such fluid passages or channels include turn-arounds or corners for routing the cooling fluid. However, the cooling fluid may stagnate when such turn-arounds or corners are abrupt, which increases thermally induced stress in the thrust chamber assembly and increases the temperature of the cooling fluid. Large turning corners also incur a pressure loss that penalizes the overall propulsive efficiency of the thrust chamber assembly. Accordingly, improved systems, apparatuses, and methods for reducing thermally induced stresses in thrust chamber assemblies are desirable.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the thrust chamber assembly. Moreover, the terms "radial" and "radially" refer to directions and orientations that extend substantially perpendicular to the centerline of the thrust chamber assembly. In addition, as used herein, the terms "circumferential" and "circumferentially" refer to directions and orientations that extend arcuately about the centerline of the thrust chamber assembly.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first," "second," and "third" may be used interchangeably to distinguish one component from another and are not intended to signify location or importance of the individual components.

For purposes of the description hereinafter, the terms "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting a second wall/surface).

As used herein, the terms "integral", "unitary", or "monolithic" as used to describe a structure refers to the structure being formed integrally of a continuous material or group of materials with no seams, connections, joints, or the like. The integral, unitary, or monolithic structures described herein may be formed through additive manufacturing to have the described structure, or alternatively through a ply layup process, etc. The integral, unitary, or monolithic structures as used herein denotes that the final component has a construction in which the integrated portions are inseparable and is different from a component including a plurality of separate component pieces that have been joined together but remain distinct and the single component is not inseparable (i.e., the pieces may be re-separated). Thus, unitary components may include generally substantially continuous pieces of material or may include a plurality of portions that are permanently bonded to one another. In any event, the various portions forming a unitary component are integrated with one another such that the unitary component is a single piece with inseparable portions.

As used herein, the term "composite material" refers to a material produced from two or more constituent materials, wherein at least one of the constituent materials is a non-metallic material. Example composite materials include polymer matrix composites (PMC), ceramic composites (CMC), chopped fiber composite materials, etc.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be metal, ceramic, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components. "Additive" may include combination additive and subtractive methods.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The successive cross-sectional slices together form the 3D component. The component is then "built-up" slice-by-slice, or layer-by-layer, until finished.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways with integral mounting features. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved functionality and reliability.

The present disclosure is generally related to a ceramic composite tubular structure, and a method for forming a ceramic composite tubular structure. In example embodiments, the ceramic composite tubular structure may include a propulsion device (e.g., a thrust chamber assembly) for a rocket engine or other type of propulsion device. In example embodiments, the ceramic composite tubular structure includes an additively manufactured (i.e., three-dimensional (3D) printed) monolithic ceramic precursor or preform in the form of a tubular-shaped cooling jacket having a number of cooling passages or channels formed therein. In example embodiments, the cooling passages or channels include a turn-around angle less than 180° to reduce flow restrictions along the cooling passages or channels. In example embodiments, the monolithic ceramic precursor or preform includes a combustion chamber and a nozzle.

Figure 1:
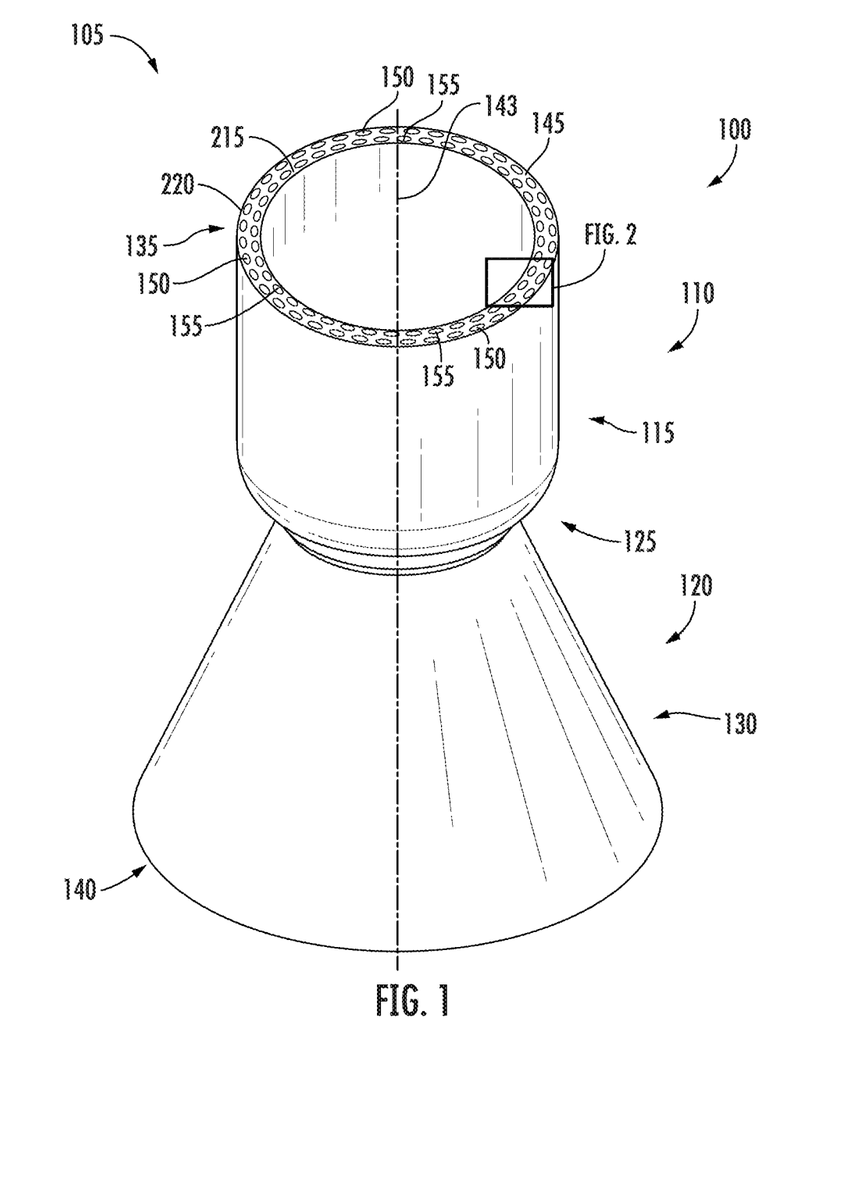
FIG. 1 is a schematic view of an exemplary ceramic composite tubular structure according to the present disclosure.
Figure 2:
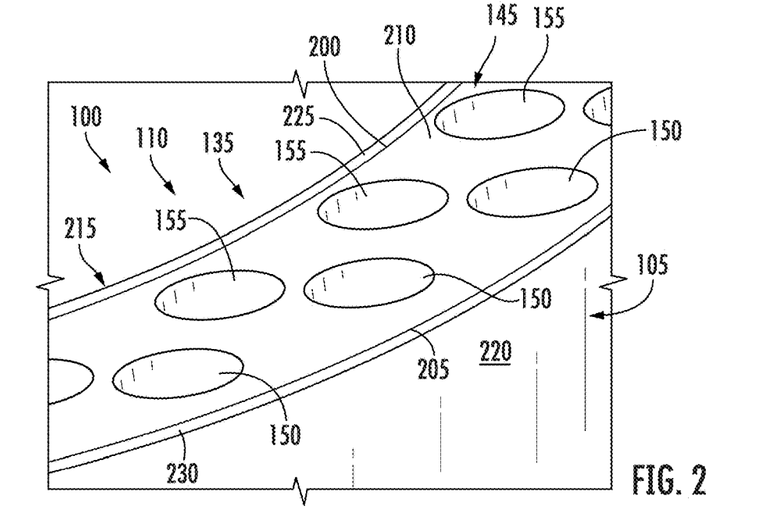
FIG. 2 is a close-up, schematic view of a portion of the exemplary ceramic composite tubular structure of FIG. 1 according to the present disclosure.

Referring now to the drawings, FIG. 1 is a schematic view of an exemplary ceramic composite tubular structure 100 according to the present disclosure. FIG. 2 is a close-up, schematic, view of a portion of the exemplary ceramic composite tubular structure 100 of FIG. 1 according to the present disclosure.

In at least one example embodiment, the ceramic composite tubular structure 100 includes a ceramic composite propulsion device 105 in the form of a thrust chamber assembly 110 usable with a rocket engine or other type of propulsion device. However, it should be understood that other types of ceramic composite propulsion devices may be formed, and the ceramic composite tubular structure 100 may include other types of devices and be used in other applications.

In some example embodiments, the thrust chamber assembly 110 includes a combustion chamber 115 in fluid communication with a nozzle 120. In the illustrated embodiment, the combustion chamber 115 and the nozzle 120 are formed as a unitary structure. However, it should be understood that the combustion chamber 115 and the nozzle 120 may be formed as separate components according to the present disclosure. In example embodiments, the thrust chamber assembly 110 includes an annular or tubular shell structure including an axisymmetric converging-diverging geometry. It should be understood that other tubular shell geometries (e.g., cylindrical tubes, conical tubes, rectangular tubes, etc.) can be fabricated without departing from the scope of the present disclosure, and other non-axisymmetric geometries can be fabricated without departing from the scope of the present disclosure. For example, the ceramic composite tubular structure 100 may include other geometries with varying cross-sectional shapes and areas. Thus, in the illustrated embodiment, the combustion chamber 115 includes a converging portion 125, and the nozzle 120 includes a diverging portion 130. The thrust chamber assembly 110 includes an open forward end, such as a first end 135, and an open aft end, such as a second end 140, opposite the first end 135. Additionally, the tubular shell structure of the thrust chamber assembly 110 defines a longitudinal axis 143 extending between the first end 135 and the second end 140 such that the combustion chamber 115 and the nozzle 120 include annular bodies coaxially located relative to the longitudinal axis 143.

As shown in FIGS. 1 and 2, the ceramic composite tubular structure 100 may include a monolithic ceramic preform 145 created using an additive manufacturing process. Exemplary embodiments of the formation of monolithic ceramic preform 145 involve the use of additive manufacturing machines or methods. The additive manufacturing processes referenced herein may be used for forming the monolithic ceramic preform 145 with one or more ceramic-based layers using any suitable ceramic particle compounds.

The monolithic ceramic preform 145 includes an inner surface 200 and an outer surface 205 defining a wall 210 of the monolithic ceramic preform 145. In the illustrated embodiment, the monolithic ceramic preform 145 includes an annular or tubular shell structure including an axisymmetric converging-diverging geometry. It should be understood that other tubular shell geometries (e.g., cylindrical tubes, conical tubes, rectangular tubes, etc.) can be fabricated without departing from the scope of the present disclosure, and other non-axisymmetric geometries can be fabricated without departing from the scope of the present disclosure. Thus, in the illustrated embodiment, the monolithic ceramic preform 145 is formed having the converging portion 125, the diverging portion 130, the open first end 135 and the open second end 140 thereby forming the combustion chamber 115 and the nozzle 120 of the thrust chamber assembly 110 as a unitary structure. However, as indicated above, the combustion chamber 115 and the nozzle 120 may be formed as separate components (e.g., made from separate monolithic ceramic preforms 145).

In at least one example embodiment, the exemplary monolithic ceramic preform 145 defines a plurality of fluid inlets 150 and a plurality of fluid outlets 155. More specifically, the wall 210 of the monolithic ceramic preform 145 defines the plurality of fluid inlets 150 and the plurality of fluid outlets 155. For example, the plurality of fluid inlets 150 and the plurality of fluid outlets 155 may be disposed between the inner surface 200 and the outer surface 205 of the wall 210. Additionally. the plurality of fluid inlets 150 and the plurality of fluid outlets 155 may be disposed at the first end 135.

As shown in FIGS. 1-2, the plurality of fluid inlets 150 and the plurality of fluid outlets 155 may be equally spaced apart from each other about a circumference of the first end 135 of the monolithic ceramic preform 145. For example, the plurality of fluid inlets 150 and the plurality of fluid outlets 155 may be equally spaced about the longitudinal axis 143. In at least one example embodiment, the plurality of fluid inlets 150 are disposed in the wall 210 adjacent the outer surface 205 and the plurality of fluid outlets 155 are disposed in the wall 210 adjacent the inner surface 200. For example, the plurality of fluid inlets 150 may circumscribe the plurality of fluid outlets 155. Moreover, the plurality of fluid inlets 150 may be offset from the plurality of fluid outlets 155 about the circumference of the first end 135 of the monolithic ceramic preform 145. For example, each of the plurality of fluid inlets 150 may be between a pair of adjacent ones of the plurality of fluid outlets 155 and each of the plurality of fluid outlets 155 may be positioned between a pair of adjacent ones of the plurality of fluid inlets 150. The plurality of fluid inlets 150 and the plurality of fluid outlets 155 may also have the same cross-sectional geometry adjacent the first end 135 of the monolithic ceramic preform 145. For example, a size or diameter of the plurality of fluid inlets 150 and the plurality of fluid outlets 155 may be the same. In some additional example embodiments, one or more of the plurality of fluid inlets 150 and one or more of the plurality of fluid outlets 155 may have one or more of a circular, ovular, or polygonal shape in cross section. Moreover, one or more of the plurality of fluid inlets 150 and one or more of the plurality of fluid outlets 155 may have varying shapes and varying circumferences.

In other example embodiments (not depicted), the plurality of fluid inlets 150 and the plurality of fluid outlets 155 may be aligned about the circumference of the first end 135 of the monolithic ceramic preform 145. In still other example embodiments (not depicted), the geometry of one or more of the plurality of fluid inlets 150 and one or more of the plurality of fluid outlets 155 may vary. For example, the size or diameter of one or more of the plurality of fluid inlets 150 and one or more of the plurality of fluid outlets 155 may vary. Accordingly, it should be understood that the placement, spacing, geometry, size, and shape of the plurality of fluid inlets 150 and the plurality of fluid outlets 155 may vary.

Figure 3:
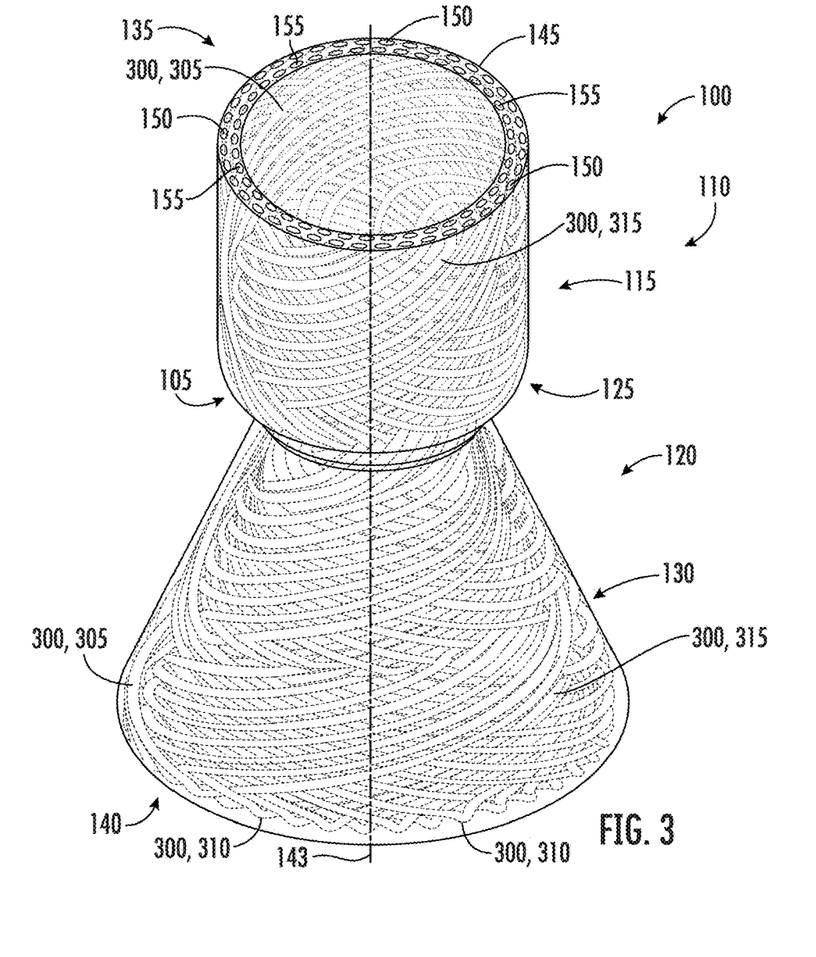
FIG. 3 is a schematic view of an interior of the exemplary ceramic composite tubular structure of FIG. 1 depicting exemplary fluid passages according to the present disclosure.

With reference FIG. 3, which is a schematic view of an interior of the exemplary ceramic composite tubular structure 100 of FIG. 1 according to the present disclosure, the exemplary monolithic ceramic preform 145 defines a plurality of fluid passages 300 in fluid communication with the plurality of fluid inlets 150 and the plurality of fluid outlets 155. The plurality of fluid inlets 150, the plurality of fluid outlets 155, and the plurality of fluid passages 300 may be created during the additive manufacturing formation of the monolithic ceramic preform 145. In some example embodiments, one or more of the plurality of fluid passages 300 may have different cross-sectional geometries (e.g., area and/or shape), and one or more of the plurality of fluid passages 300 may have a cross-sectional area that varies along the length thereof (e.g., a cross-sectional area varying continuously or non-continuously along a length thereof).

In at least one example embodiment, the plurality of fluid passages 300 are cooling passages through or within the thrust chamber assembly 110. For example, the cooling fluid may include fuel that acts as a heat sink for components of the thrust chamber assembly 110. Accordingly, the fuel may absorb heat as it flows through the plurality of fluid passages 300 within the combustion chamber 115 and the nozzle 120, thereby cooling the combustion chamber and the nozzle 120 of the thrust chamber assembly. The heated fuel may then be provided to the combustor for more efficient combustion. However, it should be understood that the plurality of fluid passages 300 may be included in the monolithic ceramic preform 145 for purposes other than cooling fluid passageways (e.g., reducing the thickness of the wall 210 of the monolithic ceramic preform 145, reducing the mass of the monolithic ceramic preform 145, etc.).

With reference to FIG. 3, the cooling fluid, may enter the plurality of fluid passages 300 via the plurality of fluid inlets 150. The cooling fluid may flow through the plurality of fluid passages 300 from the first end 135 to the second end 140 and return to the first end 135. For example, the plurality of fluid passages 300 may include a first pathway portion 305 extending from the plurality of fluid inlets 150 at the first end 135 to a curved pathway portion 310 adjacent the second end 140, and a second pathway portion 315 extending from the curved pathway portion 310 adjacent the second end 140 to the plurality of fluid outlets 155 at the first end 135.

In at least one example embodiment, the plurality of fluid passages 300 may extend about the longitudinal axis 143 of the monolithic ceramic preform 145 in a general helical pattern. For example, the plurality of fluid passages 300 may extend in a clockwise of counter-clockwise direction about the longitudinal axis 143. Moreover, a pitch of the plurality of fluid passages 300 may be constant. In other example embodiments, the pitch of the plurality of fluid passages 300 may be variable.

In at least one example embodiment, the first pathway portion 305 of the plurality of fluid passages 300 may flow in a first direction relative to the longitudinal axis 143 and the second pathway portion 315 of the plurality of fluid passages 300 may flow in a second direction relative to the longitudinal axis 143 different from the first direction. For example, the first direction may extend from the first end 135 towards the second end 140 and the second direction may extend from the second end 140 towards to the first end 135.

In at least one example embodiment, the curved pathway portion 310 includes a turn-around for changing the direction of flow of the cooling fluid through the plurality of fluid passages 300. For example, the cooling fluid flows through the first pathway portion 305 in the first direction (from the first end 135 towards the second end 140) to the curved pathway portion 310 where the cooling fluid is directed to flow in the second direction (from the second end 140 towards the first end 135) via the second pathway portion 315.

Figure 4:
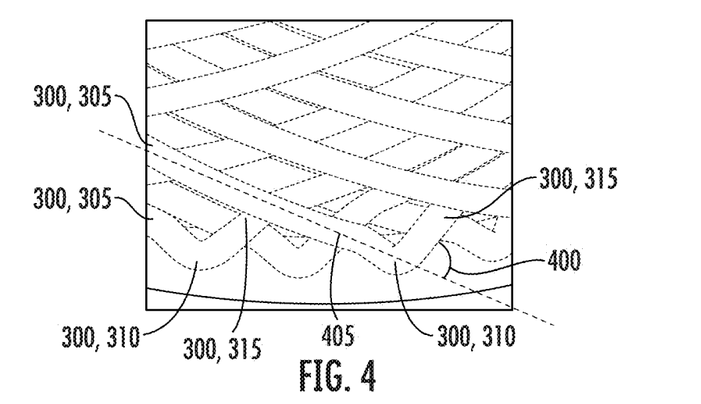
FIG. 4 is a close-up, schematic view of a portion of the fluid passages of the exemplary ceramic composite tubular structure of FIG. 3 according to the present disclosure.

FIG. 4 is a close-up, schematic, view of a portion of the plurality of fluid passages 300 of the exemplary ceramic composite tubular structure 100 of FIG. 3 according to the present disclosure. As shown in FIG. 4, an angle 400 is defined relative to an axis 405 extending through a center of the first pathway portion 305 and the second pathway portion 315. In at least one example embodiment, the angle 400 may be less than 180°.

Figure 5:
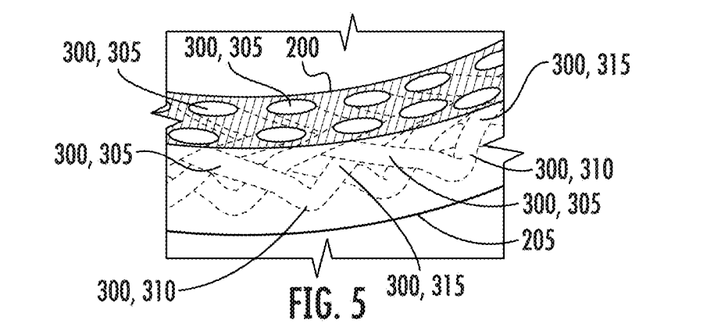
FIG. 5 is a close-up, cross-sectional view of a portion of the fluid passages of the exemplary ceramic composite tubular structure of FIG. 3 according to the present disclosure.

FIG. 5 is a close-up, cross-sectional view of a portion of the plurality of fluid passages 300 of the exemplary ceramic composite tubular structure 100 of FIG. 3 according to the present disclosure.

In at least one example embodiment, as shown in FIG. 3, the first pathway portion 305 may be adjacent the outer surface 205 and the second pathway portion 315 may be adjacent the inner surface 200. The curved pathway portion 310 may be between the inner surface 200 and the outer surface 205 such that the curved pathway portion 310 at least partially extends between the inner surface 200 and the outer surface 205. For example, the curved pathway portion 310 may make an S-turn between the inner surface 200 and the outer surface 205 such that the curved pathway portion 310 crosses over or overlaps one or both of the first pathway portion 305 and the second pathway portion 315. Accordingly, at least a portion of the plurality of fluid passages 300 may overlap another portion of the plurality of fluid passages 300.

As shown in FIG. 5, the first pathway portion 305 may generally extend from the inner surface 200 towards the outer surface 205 to the curved pathway portion 310 and overlaps or crosses a portion of one or more adjacent ones of the plurality of fluid passages 300, such as one or both of the curved pathway portion 310 and the second pathway portion 315. From the curved pathway portion 310, the second pathway portion 315 may generally extend from the outer surface 205 towards the inner surface 200 and overlaps or crosses a portion of one or more adjacent ones of the plurality of fluid passages 300, such as one or both of the curved pathway portion 310 and the first pathway portion 305. Moreover, the plurality of fluid passages 300 may be interwoven about the longitudinal axis 143 of the monolithic ceramic preform 145. For example, one or more of the first pathway portions 305 may interlace, cross, or overlap one or more of the second pathway portions 315 of the plurality of fluid passages 300.

The arrangement of the plurality of fluid passages 300 described herein may evenly distribute the cooling fluid within the thrust chamber assembly 110, such as within the combustion chamber 115 and the nozzle 120. For example, due to the angle 400 of the curved pathway portion 310 being less than 180°, the cooling fluid may flow closer to the second end 140 of the thrust chamber assembly 110. Additionally, the interwoven pattern of the plurality of fluid passages 300 may more evenly distribute the cooling fluid between the inner surface 200 and the outer surface 205 of the monolithic ceramic preform 145 of the thrust chamber assembly 110. Accordingly, thermal stresses may be more evenly distributed about the circumference of the thrust chamber assembly 110, which may prevent premature part failures of the thrust chamber assembly 110.

Referring again to FIG. 2, the ceramic composite tubular structure 100 may include an inner face sheet 215 formed on the inner surface 200 of the monolithic ceramic preform 145 and an outer face sheet 220 formed on the outer surface 205 of the monolithic ceramic preform 145. In at least one example embodiment, the inner face sheet 215 and the outer face sheet 220 include one or more ceramic composite (CMC) plies or materials.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers including oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds, and other like components, that would benefit from the lighter-weight and higher temperature capability these materials can offer.

In at least one example embodiment, the monolithic ceramic preform 145 functions as a mandrel such that a quantity of CMC plies 225 are laid up on the inner surface 200 and a quantity of CMC plies 230 are laid up on outer surface 205 and processed as described herein (e.g., undergoing thermal and/or chemical processing) to form the inner face sheet 215 and/or the outer face sheet 220, respectively. In embodiments, the inner face sheet 215 and the outer face sheet 220 extend from the first end 135 to the second end 140 such that the inner face sheet 215 and the outer face sheet 220 terminate coincident with the upstream and downstream ends or edges of the monolithic ceramic preform 145. In the exemplary embodiment shown, the inner face sheet 215 and the outer face sheet 220 substantially surround the monolithic ceramic preform 145 such that the inner face sheet 215 and the outer face sheet 220 are in contact with the respective inner surface 200 and the outer surface 205. As used herein, the terms "substantially surround" and "substantially surrounding" means that the inner surface 200 and the outer surface 205 have at least 90% of their surface areas covered by the respective inner face sheet 215 and outer face sheet 220, such as 95% of its surface area covered by the respective inner face sheet 215 and outer face sheet 220. The terms "substantially surround" and "substantially surrounding" may include completely surrounds and completely surrounding, respectively. Additionally, in embodiments, the reinforcing fibers of the CMC plies 225 and CMC plies 230 may be oriented in an annular direction corresponding to the annular orientation of the inner face sheet 215 and the outer face sheet 220. However, it should be understood that the CMC plies 225 and CMC plies 230 may be applied to the monolithic ceramic preform 145 such that the orientation of the reinforcing fibers of the CMC plies 225 and CMC plies 230 may be otherwise configured.

In at least one example embodiment, the monolithic ceramic preform 145 resulting from the additive manufacturing process is burned out and melt-infiltrated prior to the application of the CMC plies 225 and CMC plies 230 to the monolithic ceramic preform 145. For example, in embodiments, the monolithic ceramic preform 145 includes a SiC monolithic ceramic preform 145 such that, after 3D printing, the monolithic ceramic preform 145 is a combination of SiC and C. During melt infiltration of the monolithic ceramic preform 145, Si is applied to the monolithic ceramic preform 145 and, during melt infiltration, Si infiltrates the monolithic ceramic preform 145. The Si reacts with the C in the monolithic ceramic preform 145 during melt infiltration to form new, additional SiC and consolidates the monolithic ceramic preform 145 (e.g., forming a monolithic ceramic core).

In some example embodiments, after melt-infiltration of the monolithic ceramic preform 145, the CMC plies 225 and CMC plies 230 are applied to the monolithic ceramic preform 145. The CMC plies 225 and CMC plies 230 may undergo densification (e.g., melt infiltration with the monolithic ceramic preform 145). Thus, in this embodiment, a silicon-based matrix material is applied to the CMC plies 225 and/or CMC plies 230 forming the respective inner face sheet 215 and outer face sheet 220, and the monolithic ceramic preform 145, such that the monolithic ceramic preform 145 and the CMC plies 225 and/or CMC plies 230 forming the respective inner face sheet 215 and outer face sheet 220 are burned out and undergo a melt infiltration process together. As a result, the inner face sheet 215 and/or outer face sheet 220 form a seamless, integrated unitary structure with the monolithic ceramic preform 145.

Figure 6:
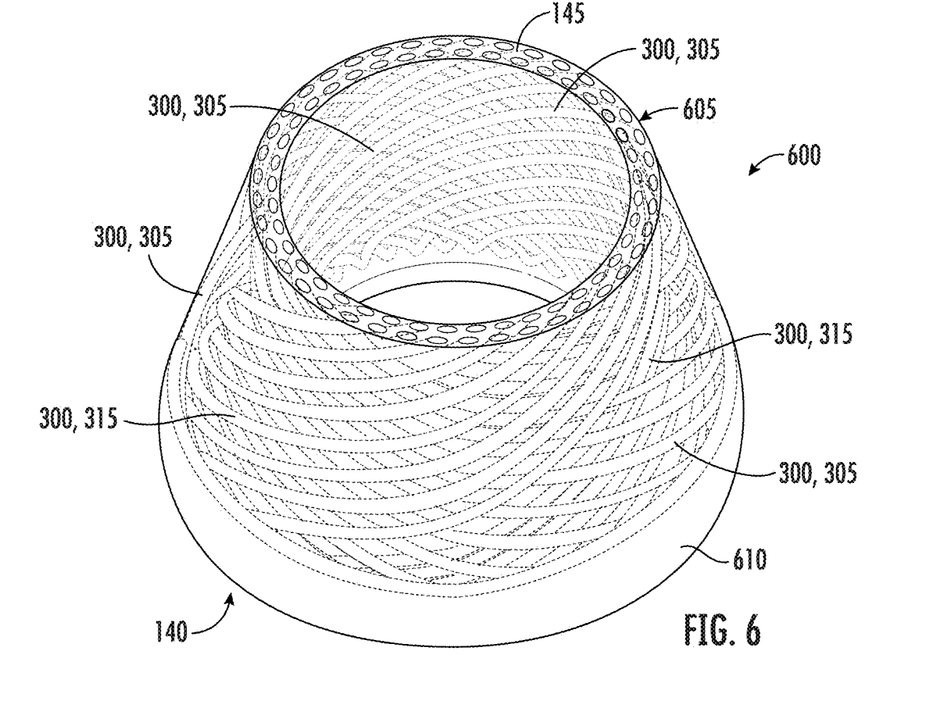
FIG. 6 is a schematic view of a portion of an exemplary ceramic composite tubular structure according to the present disclosure.

FIG. 6 is a schematic view of a portion of an exemplary ceramic composite tubular structure 600 according to the present disclosure. The ceramic composite tubular structure 600 may be similar or analogous to the exemplary ceramic composite tubular structure 100 discussed with respect to FIGS. 1-5. For example, the ceramic composite tubular structure 600 may include the ceramic composite propulsion device 105 in the form of the thrust chamber assembly 110 having a combustion chamber (not shown) and a nozzle 605. The nozzle 605 may be integrated into the exemplary ceramic composite tubular structure 100 discussed with respect to FIGS. 1-5 in place of the nozzle 120 in some example embodiments.

As shown in FIG. 6, the ceramic composite tubular structure 600 includes the monolithic ceramic preform 145 created using an additive manufacturing process, as discussed above. For example, the monolithic ceramic preform 145 defines the plurality of fluid passages 300. Additionally, the monolithic ceramic preform 145 may define a fluid chamber 610 adjacent the second end 140. The fluid chamber 610 may be in fluid communication with the plurality of fluid passages 300. For example, the fluid chamber 610 may receive the cooling fluid via the first pathway portion 305 of the plurality of fluid passages 300. The cooling fluid may flow within the fluid chamber 610, such as counter-clockwise or clockwise about the longitudinal axis, and absorb heat from the monolithic ceramic preform 145. Moreover, the cooling fluid may exit the fluid chamber 610 via the second pathway portion of the plurality of fluid passages 300.

Figure 7:
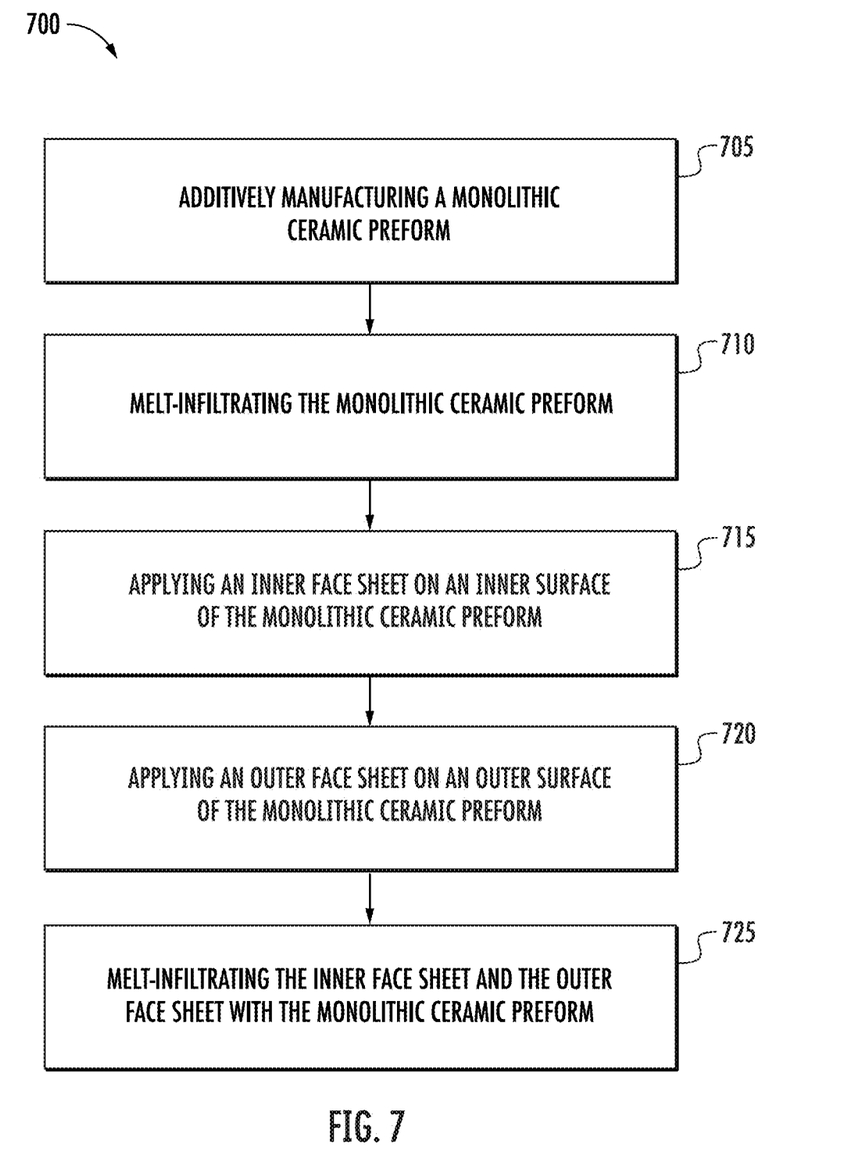
FIG. 7 is a flow diagram of an exemplary method of forming a ceramic composite tubular structure according to the present disclosure.

FIG. 7 is a flow diagram of an exemplary method 700 of forming a ceramic composite tubular structure according to the present disclosure. For example, the method 700 may be utilized to form the ceramic composite tubular structure 100 and the ceramic composite tubular structure 600.

In at least one example embodiment, the method 700 includes additively manufacturing a monolithic preform at 705, melt-infiltrating the monolithic ceramic preform at 710, forming an inner face sheet on an inner surface of the monolithic ceramic preform at 715, forming an outer face sheet on an outer surface of the monolithic ceramic preform at 720, and melt-infiltrating the inner face sheet and the outer face sheet with the monolithic ceramic preform at 725.

Additively manufacturing a monolithic preform at 705 includes additively manufacturing the exemplary monolithic ceramic preform 145 of one or both of the exemplary ceramic composite tubular structures 100, 600. The monolithic ceramic preform 145 includes the plurality of fluid inlets 150 and the plurality of fluid outlets 155. The monolithic ceramic preform 145 also includes the plurality of fluid passages 300. For example, the plurality of fluid passages 300 include the first pathway portion 305 extending from the plurality of fluid inlets 150 at the first end 135 to the curved pathway portion 310 adjacent the second end 140, and the second pathway portion 315 extending from the curved pathway portion 310 adjacent the second end 140 to the plurality of fluid outlets 155 at the first end 135, as discussed above with respect to FIGS. 3-5. Additionally, the monolithic ceramic preform 145 may include the fluid chamber 610 in fluid communication with the first pathway portion 305 and the second pathway portion 315, as discussed with respect to FIG. 6.

At 710, the method 700 includes melt-infiltrating the monolithic ceramic preform 145. At 715, the method 700 includes applying the inner face sheet 215 on the inner surface 200 of the monolithic ceramic preform 145. For example, the inner face sheet 215 may be formed using a quantity of CMC plies (e.g., the CMC plies 225). At 720, the method 700 includes applying the outer face sheet 220 on the outer surface 205 of the monolithic ceramic preform 145. For example, the outer face sheet 220 may be formed using a quantity of CMC plies (e.g., the CMC plies 230). At 725, the method 700 may include melt-infiltrating the inner face sheet 215 and the outer face sheet 220 with the monolithic ceramic preform 145.

Thus, embodiments of the present disclosure provide a ceramic composite tubular structure, and a method for forming a ceramic composite tubular structure, having an additively manufactured ceramic monolithic core wrapped with inner and outer CMC face sheets. The ceramic monolithic core is wrapped on its inner and outer surfaces with CMC material, burned out, and melt-infiltrated to create a unitary ceramic composite tubular structure. The ceramic monolithic core includes cooling passages of a size and shape that can be designed for specific performance parameters. For example, the cooling passages may evenly distribute cooling fluid within the thrust chamber assembly such that the cooling fluid may more efficiently absorb heat and thermal stresses may be more evenly distributed about the circumference of the thrust chamber assembly. Additionally, because the ceramic monolithic core is created using additive manufacturing techniques, the ceramic monolithic core may be formed with varying shapes and/or sizes, such as with converging and diverging sections, to accommodate a respective combustion and nozzle sections for a thrust assembly application.

Further aspects are provided by the subject matter of the following clauses:

A thrust chamber assembly, comprising: a monolithic preform defining a combustion chamber and a nozzle, the monolithic preform having a tubular shape and including a first end, a second end opposite the first end, an inner surface, and an outer surface, the monolithic preform defining: a plurality of fluid inlets disposed at the first end, a plurality of fluid outlets disposed at the first end, and a plurality of fluid passages between the inner surface and the outer surface, the plurality of fluid passages in fluid communication with the plurality of fluid inlets and the plurality of fluid outlets; wherein each of the plurality of fluid passages comprises a first pathway portion, a second pathway portion, and a curved portion between the first pathway portion and the second pathway portion; wherein the curved portion is adjacent the second end, the first pathway portion extends between the plurality of fluid inlets and the curved portion, and the second pathway portion extends between the curved portion and the plurality of fluid outlets; and wherein the plurality of fluid passages are arranged in a helical pattern.

The thrust chamber assembly of any preceding clause, wherein the plurality of fluid inlets and the plurality of fluid outlets are disposed circumferentially about the first end.

The thrust chamber assembly of any preceding clause, wherein the plurality of fluid inlets circumscribe the plurality of fluid outlets.

The thrust chamber assembly of any preceding clause, wherein the plurality of fluid inlets and the plurality of fluid outlets are equally spaced about a circumference of the monolithic preform.

The thrust chamber assembly of any preceding clause, wherein: the first pathway portion flows in a first direction and the second pathway portion flows in a second direction different from the first direction; the first direction is from the first end to the second end; and the second direction is from the second end to the first end.

The thrust chamber assembly of any preceding clause, wherein: the first pathway portion is adjacent the outer surface; the second pathway portion is adjacent the inner surface; and the curved portion extends between the inner surface and the outer surface.

The thrust chamber assembly of any preceding clause, wherein the curved portion defines an angle between the first pathway portion and the second pathway portion.

The thrust chamber assembly of any preceding clause, wherein the angle is less than 180°.

The thrust chamber assembly of any preceding clause, wherein a fluid flowing through the plurality of fluid passages is configured to absorb heat from the monolithic preform.

The thrust chamber assembly of any preceding clause, wherein the combustion chamber includes a converging portion and the nozzle includes a diverging portion.

The thrust chamber assembly of any preceding clause, wherein the plurality of fluid passages are interwoven.

The thrust chamber assembly of any preceding clause, wherein each of the plurality of fluid inlets and each of the plurality of fluid outlets comprise a cross section having one or more of a circular, ovular, or polygonal shape.

The thrust chamber assembly of any preceding clause, wherein one or more of the plurality of fluid passages comprise a varying cross-sectional geometry over a length of the plurality of fluid passages.

The thrust chamber assembly of any preceding clause, wherein the curved portion comprises a fluid chamber defined by the monolithic preform adjacent the second end.

The thrust chamber assembly of any preceding clause, wherein: the first pathway portion is configured to deliver a fluid to the fluid chamber from the plurality of fluid inlets; and the second pathway portion is configured to deliver the fluid from the fluid chamber to the plurality of fluid outlets.

The thrust chamber assembly of any preceding clause, further comprising: an inner face sheet coupled to the inner surface of the monolithic preform; and an outer face sheet coupled to the outer surface of the monolithic preform.

The thrust chamber assembly of any preceding clause, wherein: the inner face sheet comprises a first quantity of ceramic matrix composite plies; and the outer face sheet comprises a second quantity of ceramic matrix composite plies.

The thrust chamber assembly of any preceding clause, wherein the inner face sheet and the outer face sheet extend from the first end to the second end.

The thrust chamber assembly of any preceding clause, wherein the monolithic preform is created using an additive manufacturing process.

A method of forming a thrust chamber assembly, comprising: forming a monolithic preform having a tubular shape and including a first end, a second end opposite the first end, an inner surface, and an outer surface extending between the first end and the second end, the monolithic preform defining: a plurality of fluid inlets disposed at the first end, a plurality of fluid outlets disposed at the first end, and a plurality of fluid passages between the inner surface and the outer surface, the plurality of fluid passages including a first pathway portion, a second pathway portion, and a curved portion between the first pathway portion and the second pathway portion, wherein the curved portion is adjacent the second end, the first pathway portion extends between the plurality of fluid inlets and the curved portion, and the second pathway portion extends between the curved portion and the plurality of fluid outlets; applying an inner face sheet on the inner surface of the monolithic preform; and applying an outer face sheet on the outer surface of the monolithic preform.

The method of any preceding clause, wherein: the first pathway portion is adjacent the outer surface; the second pathway portion is adjacent the inner surface; and the curved portion extends between the inner surface and the outer surface.

The method of any preceding clause, wherein the curved portion defines an angle between the first pathway portion and the second pathway portion.

The method of any preceding clause, wherein the angle is less than 180°.

The method of any preceding clause, wherein forming the monolithic preform comprises forming one or more of the plurality of fluid inlets and one or more of the plurality of fluid outlets with a varying cross-sectional geometry.

The method of any preceding clause, further comprising forming the monolithic preform to include at least one of a converging portion or a diverging portion.

The method of any preceding clause, wherein forming the monolithic preform comprises forming the monolithic preform using an additive manufacturing process.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A thrust chamber assembly, comprising:
a monolithic preform defining a combustion chamber and a nozzle, the monolithic preform having a tubular shape and including a first end, a second end opposite the first end, an inner surface, and an outer surface, the monolithic preform defining:
a plurality of fluid inlets disposed at the first end,
a plurality of fluid outlets disposed at the first end, and
a plurality of fluid passages between the inner surface and the outer surface, the plurality of fluid passages in fluid communication with the plurality of fluid inlets and the plurality of fluid outlets;
wherein each of the plurality of fluid passages comprises a first pathway portion, a second pathway portion, and a curved portion between the first pathway portion and the second pathway portion;
wherein the curved portion is adjacent the second end, the first pathway portion extends between the plurality of fluid inlets and the curved portion, and the second pathway portion extends between the curved portion and the plurality of fluid outlets;
wherein the plurality of fluid passages are arranged in a helical pattern; and wherein a first fluid passage of the plurality of fluid passages and a second fluid passage of the plurality of fluid passages are arranged such that at least a portion of the first fluid passage and at least a portion of the second fluid passage are interwoven to limit thermal stresses and prevent premature failure of the thrust chamber assembly.

2. The thrust chamber assembly of claim 1, wherein the plurality of fluid inlets and the plurality of fluid outlets are disposed circumferentially about the first end.

3. A thrust chamber assembly, comprising:
a monolithic preform defining a combustion chamber and a nozzle, the monolithic preform having a tubular shape and including a first end, a second end opposite the first end, an inner surface, and an outer surface, the monolithic preform defining:
a plurality of fluid inlets disposed at the first end,
a plurality of fluid outlets disposed at the first end, and
a plurality of fluid passages between the inner surface and the outer surface, the plurality of fluid passages in fluid communication with the plurality of fluid inlets and the plurality of fluid outlets;
wherein each of the plurality of fluid passages comprises a first pathway portion, a second pathway portion, and a curved portion between the first pathway portion and the second pathway portion such that the curved portion of a first fluid passage crosses over or overlaps at least one of the first pathway portion or the second pathway portion of a second fluid passage;
wherein the curved portion is adjacent the second end, the first pathway portion extends between the plurality of fluid inlets and the curved portion, and the second pathway portion extends between the curved portion and the plurality of fluid outlets; and
wherein the plurality of fluid passages are arranged in a helical pattern.

4. The thrust chamber assembly of claim 3, wherein the plurality of fluid inlets and the plurality of fluid outlets are disposed circumferentially about the first end.

5. The thrust chamber assembly of claim 4, wherein the plurality of fluid inlets circumscribe the plurality of fluid outlets.

6. The thrust chamber assembly of claim 4, wherein the plurality of fluid inlets and the plurality of fluid outlets are equally spaced about a circumference of the monolithic preform.

7. The thrust chamber assembly of claim 3, wherein the first pathway portion flows in a first direction and the second pathway portion flows in a second direction different from the first direction.

8. The thrust chamber assembly of claim 7, wherein:
the first direction is from the first end to the second end; and
the second direction is from the second end to the first end.

9. The thrust chamber assembly of claim 3, wherein:
the first pathway portion is adjacent the outer surface;
the second pathway portion is adjacent the inner surface; and
the curved portion extends between the inner surface and the outer surface.

10. The thrust chamber assembly of claim 3, wherein an angle is defined relative to an axis extending through a center of the first pathway portion and the second pathway portion.

11. The thrust chamber assembly of claim 10, wherein the angle is less than 180°.

12. The thrust chamber assembly of claim 3, wherein the combustion chamber includes a converging portion and the nozzle includes a diverging portion.

13. The thrust chamber assembly of claim 3, wherein each of the plurality of fluid inlets and each of the plurality of fluid outlets comprise a cross section having one or more of a circular, ovular, or polygonal shape.

14. The thrust chamber assembly of claim 3, wherein one or more of the plurality of fluid passages comprise a varying cross-sectional geometry over a length of the plurality of fluid passages.

15. The thrust chamber assembly of claim 3, wherein the curved portion comprises a fluid chamber defined by the monolithic preform adjacent the second end.

16. The thrust chamber assembly of claim 15, wherein:
the first pathway portion is configured to deliver a fluid to the fluid chamber from the plurality of fluid inlets; and
the second pathway portion is configured to deliver the fluid from the fluid chamber to the plurality of fluid outlets.

17. The thrust chamber assembly of claim 3, further comprising:
an inner face sheet coupled to the inner surface of the monolithic preform; and
an outer face sheet coupled to the outer surface of the monolithic preform.

18. The thrust chamber assembly of claim 17, wherein:
the inner face sheet comprises a first quantity of ceramic matrix composite plies; and
the outer face sheet comprises a second quantity of ceramic matrix composite plies.

19. The thrust chamber assembly of claim 17, wherein the inner face sheet and the outer face sheet extend from the first end to the second end.

20. The thrust chamber assembly of claim 3, wherein the monolithic preform is created using an additive manufacturing process.

* * * * *